INVENTORS
Richard S. Gaugler
BY Donald C. Siegla
J.C. Evans
Their Attorney

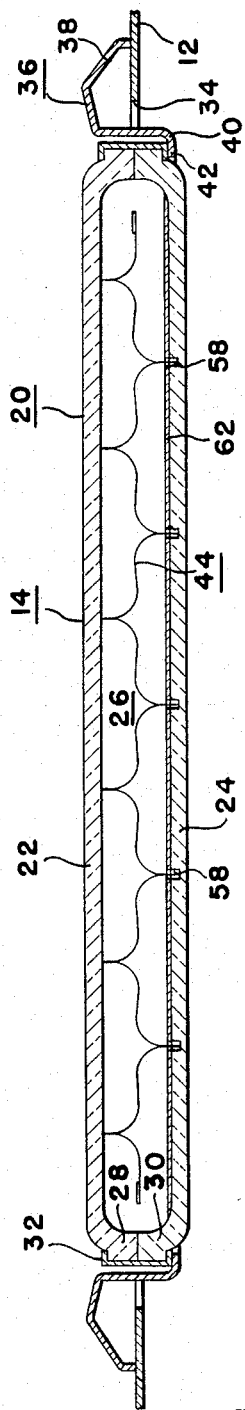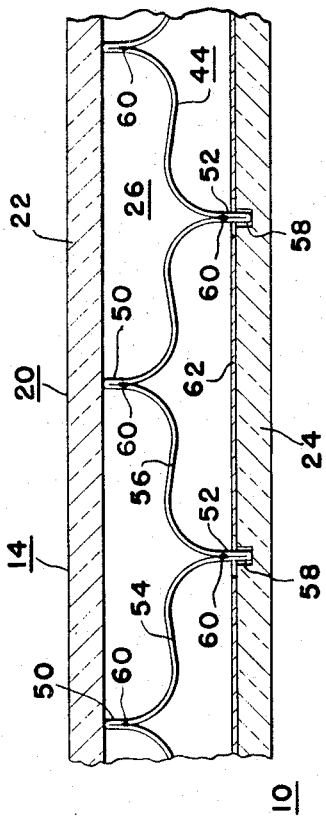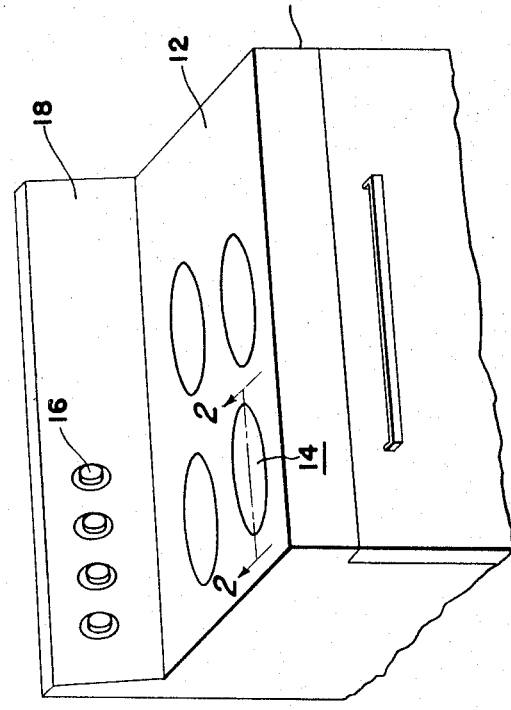

3,316,390
ELECTRIC HOT PLATE
Richard S. Gaugler and Donald C. Siegla, Dayton, Ohio, assignors to General Motors Corporation, Detroit, Mich., a corporation of Delaware
Filed Apr. 21, 1965, Ser. No. 449,812
14 Claims. (Cl. 219—464)

This invention relates to surface heating units and more particularly to electrical resistance surface heating units of the infrared type.

Surface heating units for association with domestic ranges, built-in cooking units, and the like, to have a desirable durability, utilized a spirally-wound resistance heating element that is located in a protective outer sheath or tubular cladding. Such units are characterized by a relatively slow heat-up period following initial energization thereof which results in cooking delays that are not present in gas type surface heating units.

In order to make electrical surface heating units more competitive with instantly responsive gas heating units, it has been proposed to use an infrared surface heating unit wherein an exposed electrical heating unit is energized to a temperature for producing a substantial amount of infrared energy utilized to heat utensils by radiation rather than by conductive heating. Such units are characterized by a reduced response time in part due to the physical dimensions of the electrical resistance element and in part due to the elimination of a protective cladding as found in most present-day electrical surface heating units.

An object of the present invention is to improve such infrared surface heating units by the provision therein of a self-suporting electrical resistance heating element that is electrically insulated from ground potential and from short circuiting between adjacent turns of the heating element.

A further object of the present invention is to improve infrared surface heating elements by the provision therein of a self-suporting electrical resistance heating element that is substantially thermally isolated from a surrounding envelope of the surface heating unit to prevent excessive cooling of the heating element.

A still further object of the present invention is to improve infrared surface heating units by the provision therein of a self-supporting electrical resistance heating element including means for mechanically supporting and restraining the heating element to reduce the stresses therein tending to produce distortion thereof.

Yet another object of the present invention is to improve infrared surface heating elements by the provision of a low-profile envelope having spaced apart upper and lower plates surrounding a self-supporting electrical resistance heating element energizable to direct infrared radiation against either one of said plates wherein said self-suporting heating element has integrally formed, thin-sectioned plate engaging portions thereon that serve as the sole means for locating the heating element in spaced relationship to said upper and lower plates whereby the heating element is substantially thermally isolated from the plates to prevent excessive cooling of the heating element.

Still another object of the present invention is to improve surface heating elements of the infrared type by the provision of a continuously formed ribbon-shaped heating element including portions thereon that support the heating element in spaced relationship with respect to a surrounding envelope wherein the support portions are electrically insulated from the electrical circuit through the heating element to reduce heat transfer from the heating element into the surrounding envelope.

Further objects and advantages of the present invention will be apparent from the following description, reference being had to the accompanying drawings wherein preferred embodiments of the present invention are clearly shown.

In the drawings.

FIGURE 1 is a perspective view of a domestic range unit having surface heating units constructed in accordance with the present invention;

FIGURE 2 is an enlarged view in vertical section taken along the line 2—2 of FIGURE 1;

FIGURE 3 is an enlarged, fragmentary, vertical, sectional view of a portion of the structure shown in FIGURE 2.

Figure 4:
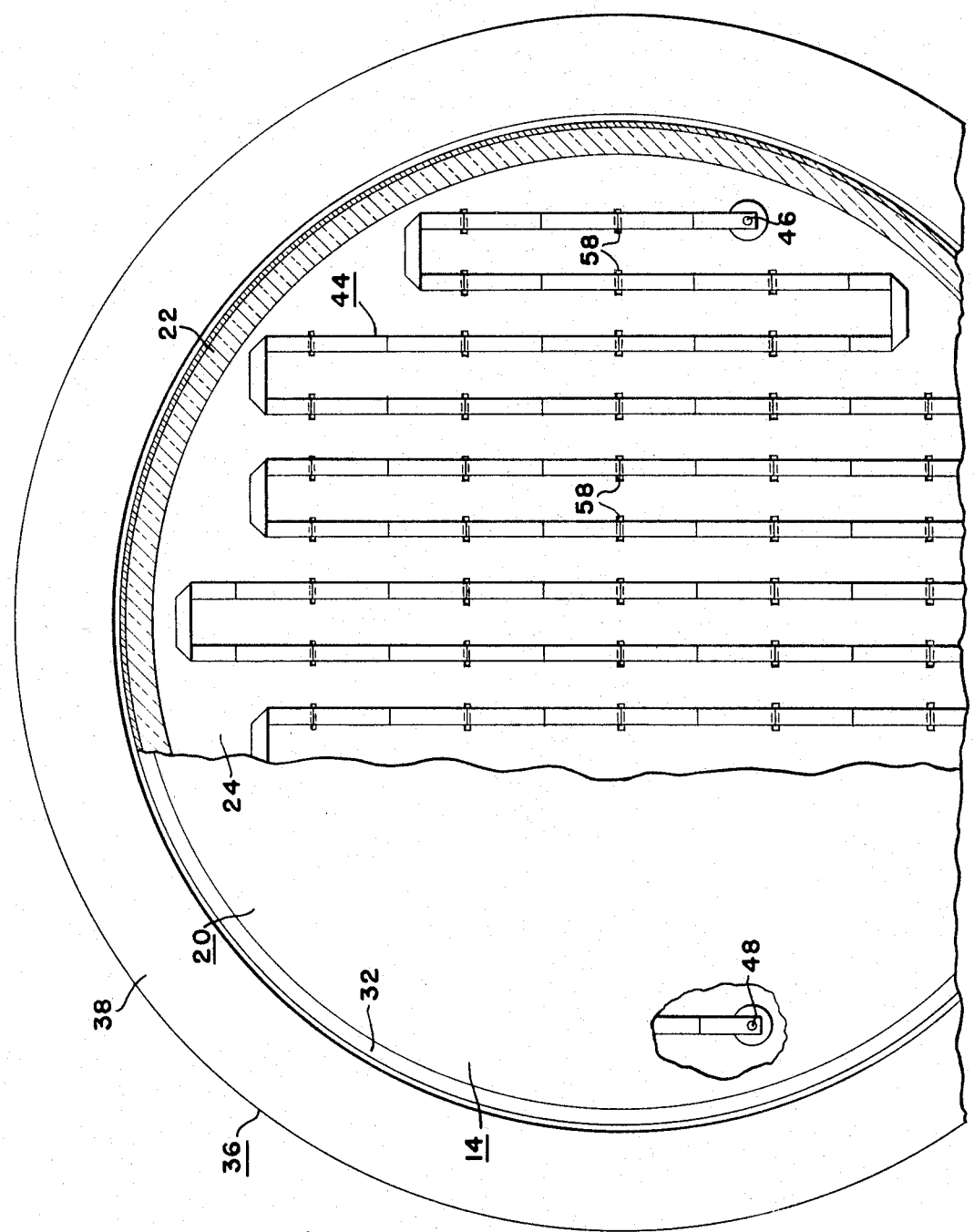
FIGURE 4 is a top plan view, partially broken away, of one of the surface heating units in FIGURE 1.

Referring now to FIGURE 1, an electric range 10 is shown having an upper work surface 12 thereon on which are located a plurality of surface heating units 14 selectively energizable by suitable controllers including control knobs 16 located on a rear control panel 18 of the range 10.

Each of the surface heating units 14 are of the infrared type and are illustrated as including a low-profile envelope 20 including a generally circular upper utensil supporting plate 22 and a generally circular lower bearing plate 24 spaced below the upper plate 22 to form a space 26 therebetween. The upper plate 22 is constructed from a suitable electrical insulating, high-strength, infrared transmissive material such as quartz, a recrystallized glass ceramic such as Cer-Vit, manufactured by Owens-Illinois, or the like. Preferably the lower plate 24 is formed of a suitable electrically insulating ceramic material such as alumina, steatite, or the like, having a low-thermal mass.

In the illustrated embodiment, the plates 22, 24 each has a peripheral edge 28, 30, respectively, formed continuously therearound and arranged so that the edge 28 of the upper support plate 22 is supportingly received on the edge 30 of the lower bearing plate 24. The plates 22, 24 are joined at their peripheral edges 28, 30 by a continuously formed ring member 32 that is fitted over the edges 28, 30, as best seen in FIGURE 2, to hold the plates together and to seal against the entrance of foreign matter from exteriorly of the envelope 20 into the interior space 26 thereof.

The unit 20 is representatively shown as being concentrically supportingly located within an opening 34 in the work surface 12 by an annular support ring 36 including an upper portion 38 contacting the work surface 12 around the opening 34 therein and a depending portion 40 having a radially inwardly turned end 42 thereon that supportingly receives the underside of the edge 30 on the lower bearing plate 24.

Within the interior space 26 is located a continuously formed self-supporting electrical resistance heating element 44 having one end thereof connected to a terminal 46 and the opposite end thereof connected to a terminal 48, as best seen in FIGURE 4. The terminals 46, 48 are adapted to be connected across a suitable source of power for energizing the continuous heating element 44 to a point where its temperature is sufficient to produce a substantial amount of radiation therefrom in the infrared range. To effect a suitable infrared radiation, the element 44 preferably is constructed of a high-temperature electrical resistance material from a nickel-chromium family or an iron-chromium family or the like having desirable strength and electrical characteristics when the element 44 is self-heated into the range of 1500° F. to 2000° F.

In accordance with certain of the principles of the present invention, the heating element 44 is disposed between the plates 22, 24 throughout substantially the full planar extent thereof whereby the infrared radiation therefrom will be directed against a supporting utensil without need for means for focusing the radiant output of the heating element 44 against the utensil.

In accordance with certain other of the principles of the present invention, the heating element 44 is constructed and arranged so that it is electrically insulated from ground potential and from short circuiting between adjacent portions of the heating element. Furthermore, the heating element 44 is relatively thermally isolated from the plates 22, 24 to prevent excessive cooling of the heating element where it engages the plates 22, 24. Furthermore, the heating element 44 is characterized by a self-supporting configuration that locates the greatest part of the heating element in spaced relationship with respect to both the upper plate 22 and the lower plate 24 and mechanically supports it with respect thereto in a manner to relieve the heating element 44 of stresses which might tend to produce distortion therein.

Referring now more particularly to the heating element 44, as best seen in FIGURE 3, it has a ribbon shape which is merely representative of one suitable configuration that presents a substantial radiant surface exposed to utensils supported on the upper support plate 22. The ribbon-shaped heating element 44 has oppositely directed folded portions 50, 52 thereon that are integrally joined by curved segments 54, 56. The folded portions 50, 52 form reinforced, thin-sectioned supporting legs on the heating element 44 that, as best seen in FIGURE 4, form only a relatively slight amount of the total surface area of the surface heating element 44. The ribbon-shaped heating element 44 in the embodiment of the invention shown in FIGURES 2 through 4 extends between the terminal 46 and the terminal 48 directed back and forth between the inner edges of the plates 22, 24 in spaced parallelism to form a generally rectangular pattern that extends throughout the planar extent of the upper supporting plate 22. The illustrated configuration is, however, merely one representative showing of a suitable geometric pattern for distributing the continuous heating element across the planar extent of the upper supporting plate 22 with it being understood that circular, spiral, or other configurations that extend across the planar extent of the upper supporting plate 22 would be equally suitable to carry out the objects of the present invention.

To maintain the segments of the heating element 44 from short circuiting, the folded portions 52 thereon are fitted into spaced apart grooves 58 in the lower bearing plate 24 following the rectangular pattern of element 44. The portions 52 contact the lower bearing plate 24 on a line contact which reduces conductive heat transfer from the heating element 44 to the lower plate 24.

In the illustrated arrangement, the oppositely directed folded portions 50 are guidingly engaged with the upper support plate 22 for relative movement with respect thereto.

Each of the folded portions 50, 52 is interconnected by a spot weld 60 to form a continuous electrical path which shunts or by-passes the material at the terminus ends of the joined portions 50, 52 where they contact the plates 22, 24. Accordingly, when the heating element 44 is energized, an electrical path is formed therethrough that passes only through the curved segments 54, 56 therein. This causes substantially the full exposed surface heating area of the element 44 to be heated into the infrared radiation range while maintaining the portions of the self-supporting heating element 44 in engagement with the plates 22, 24 relatively cool so as to reduce heat transfer from the heating element 44 that might unduly reduce the temperature of the heating element 44 so as to reduce the infrared heating effectiveness thereof.

Another feature of the present invention is the provision of the curved segments or undulations 54, 56 that serve to take up expansion of the heating element 44 between the interconnection thereof to the lower support plate 24 provided by the folded portions 52. The illustrated S-shaped undulations formed by the curved segments 54, 56 are merely representative of one suitable arrangement for providing sufficient flexibility in the continuously formed self-supporting heating element to compensate for such expansion.

When the heating element 44 is energized, the upper surface area of the curved portions 54, 56 will directly pass radiant energy through the infrared transmissive upper utensil supporting plate 22 and the infrared radiation from the undersurface thereof is directed downwardly against an infrared reflective layer 62 of gold, silver or the like formed on the lower bearing plate 24 to be redirected through the upper support plate 22 whereby substantially all of the infrared radiation from the heating element 44 is utilized to raise the temperature of a utensil on the unit 20.

While the embodiments of the present invention as herein disclosed constitute preferred forms, it is to be understood that other forms might be adopted.

What is claimed is as follows:

1. An infrared surface heating unit comprising, an upper support plate of infrared transmissive material, a lower bearing plate spaced below said upper support plate, a continuously formed self-supporting electrical resistance heating element located between said upper and lower plates energizable to produce a substantial radiation in the infrared range, said heating element including a plurality of undulating segments, spaced apart depending leg portions on said heating element supported on said lower bearing plate for locating said undulating segments in spaced relationship to said upper support plate and said lower bearing plate, adjacent pairs of said leg portions having one of said undulating segments located therebetween whereby self-heating expansion of said heating element upon energization thereof is taken up by said undulating segments located between said spaced apart depending leg portions.

2. An infrared surface heating unit comprising a low-profile envelope including an upper support plate of infrared transmissive material and a lower bearing plate of low-thermal mass spaced below said upper support plate, a self-supporting continuously formed electrical resistance heating element disposed throughout substantially the full planar extent of said upper supporting surface energizable to produce a substantial radiation in the infrared range, said heating element including a plurality of undulating segments electrically connected to one another, a plurality of depending legs on said heating element supported by said lower bearing plate to locate said undulating segments in spaced relationship with respect to said upper support plate and said lower bearing plate, adjacent pairs of said depending leg portions having an undulating segment located therebetween whereby self-heating expansion of said element upon energization thereof is taken up by said undulating segment between said leg portions.

3. An infrared surface heating unit comprising a low-profile envelope including an upper support plate of infrared transmissive material and a low bearing plate of low thermal mass spaced below said upper support plate, a self-supporting electrical resistance heating element located between said upper and lower bearing plates energizable to produce a substantial radiation in the infrared range, said heating element having a plurality of spaced apart portions thereon arranged in juxtaposition to form reinforced depending legs supported on said lower bearing plate for locating said heating element in spaced relationship to said upper support plate and said lower bearing plate, said heating element further including an undulating portion located between each of said legs for taking up expansion of said element upon energization thereof.

4. In the combination of claim 3, said undulating segments of said resistance element being electrically connected one to the other and electrically insulated from the portion of said legs supported on said lower bearing plate.

5. An infrared surface heating unit comprising an upper support plate of infrared transmissive material, a lower bearing plate of low thermal mass spaced below said upper support plate, a self-supporting electrical resistance heating element located between said upper and lower bearing plates energizable to produce a substantial radiation in the infrared range, said heating element including a plurality of integrally formed undulating portions including folded together segments located in juxtaposition to form spaced apart depending legs on said heating element supported by said lower bearing plate for locating said heating element in spaced relationship to said upper plate and said lower bearing plate, said heating element between said legs being curved to compensate for expansion of said element produced by self-heating thereof on energization.

6. In the combination of claim 5, spot welds at the folded segments of said heating element for electrically by-passing the ends of said legs contacting said lower bearing plate when said resistance element is energized.

7. An infrared surface heating unit comprising a low-profile envelope including an upper support plate of infrared transmissive material, a lower bearing plate of low thermal mass spaced below said upper supporting plate, a self-supporting electrical resistance heating element located between said upper and lower bearing plates energizable to produce a substantial radiation in the infrared range, said heating element being a continuous ribbon convoluted to have oppositely directed spaced apart folded portions located in juxtaposition, said spaced apart folded portions extending in one direction being supported on said lower bearing plate for locating said continuous ribbon in spaced relationship with respect to said upper support plate and said lower bearing plate, said continuous ribbon between said folded portions being curved to take up expansion in said resistance element produced by self-heating through energization of said element.

8. In the combination of claim 7, a spot weld joining said folded portions adjacent said curved portions for electrically connecting said curved portions together to form the electrical path through said heating element, said spot welding serving to electrically insulate said folded portions from said electrical path through said resistance element.

9. An infrared surface heating unit comprising a low-profile envelope including an upper support plate of infrared transmissive material, a lower bearing plate of low thermal mass spaced below said upper support plate, a self-supporting electrical resistance heating element located between said upper and lower plates energizable to produce a substantial radiation in the infrared range, said resistance element formed as a continuous ribbon including depending spaced apart portions thereon supported by said lower bearing plate for locating said ribbon in spaced relationship with said upper support plate and said lower bearing plate, said continuous ribbon including curved segments disposed between said depending portions for taking up expansion of said continuous ribbon resulting from energization thereof.

10. An infrared surface heating unit comprising a low-profile envelope including an upper support plate of infrared transmissive material, a lower bearing plate of low thermal mass spaced below said upper support plate, means joining the peripheral edges of said upper support plate and said lower bearing plate for sealing the interior space therebetween, a layer of infrared reflective material on the upper surface of said lower bearing plate, a continuous ribbon-shaped electrical resistance heating element extending throughout substantially the full planar extent of said upper support plate located between said upper support plate and said lower bearing plate energizable to produce a substantial radiation in the infrared range, said continuous ribbon-shaped heating element including a plurality of depending portions supported by said lower bearing plate for locating said element in spaced relationship to said upper support plate and said lower bearing plate, said continuous ribbon-shaped resistance element including a curved segment between each of said depending portions for taking up expansion in said element produced by energization thereof.

11. In the combination of claim 10, said depending portions including a portion of said ribbon-shaped resistance element folded on itself to be located in juxtaposition.

12. In the combination of claim 10, said continuous ribbon-shaped heating element further including portions thereon directed oppositely to said depending portions for guiding said resistance element with respect to said upper surface.

13. In the combination of claim 10, said curved segments of said ribbon-shaped heating element being S-shaped and joined between said depending portions to form an oppositely directed portion on said resistance element for guiding said resistance element with respect to said upper support plate.

14. In an infrared surface heating unit including an upper support plate and a lower spaced apart bearing plate the improvement comprising a continuous ribbon-shaped electrical resistance heating element having oppositely directed folded portions interconnected by curved portions to form a continuously undulating resistance element, a spot weld joining each of said oppositely directed folded portions to form a continuous electrical path through said curved portions that by-passes the ends of said folded portions, said ends of said folded portions forming a thin line bearing surface adapted to supportingly engage the lower bearing plate of an infrared surface heating unit whereby heat transfer by conduction from said resistance element to the lower bearing plate is substantially reduced.

References Cited by the Examiner

UNITED STATES PATENTS

| | | | |
|---|---|---|---|
| 1,649,809 | 11/1927 | Campbell | 338—290 |
| 2,179,934 | 11/1939 | Jones | 219—538 |
| 2,799,765 | 7/1957 | Jenkins et al. | 219—464 X |
| 2,870,316 | 1/1959 | Ferguson | 219—464 X |
| 2,874,257 | 2/1959 | Kuhn et al. | 338—316 X |
| 3,027,532 | 3/1962 | Du Bois | 338—316 X |

RICHARD M. WOOD, *Primary Examiner.*

H. L. BENDER, *Assistant Examiner.*